(12) United States Patent
Fletcher

(10) Patent No.: US 10,089,713 B2
(45) Date of Patent: Oct. 2, 2018

(54) SYSTEMS AND METHODS FOR REGISTRATION OF IMAGES

(71) Applicant: CANON KABUSHIKI KAISHA, Tokyo (JP)

(72) Inventor: Peter Alleine Fletcher, Rozelle (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 15/077,704

(22) Filed: Mar. 22, 2016

(65) Prior Publication Data

US 2016/0350893 A1 Dec. 1, 2016

(30) Foreign Application Priority Data

May 29, 2015 (AU) ................................ 2015202937

(51) Int. Cl.
*G06K 9/32* (2006.01)
*G06T 3/00* (2006.01)

(52) U.S. Cl.
CPC .................................. *G06T 3/0081* (2013.01)

(58) Field of Classification Search
USPC ........... 283/72; 345/629; 348/135, 152, 700; 358/474; 382/103, 107, 128, 130, 255, 382/278, 280, 287, 294, 299
See application file for complete search history.

(56) References Cited

U.S. PATENT DOCUMENTS

| | | | | |
|---|---|---|---|---|
| 6,018,349 A | * | 1/2000 | Szeliski | ................ G06T 3/0068 345/629 |
| 6,658,059 B1 | | 12/2003 | Iu et al. | |
| 7,106,914 B2 | * | 9/2006 | Tipping | ................ G06T 3/4053 382/299 |
| 7,602,997 B2 | * | 10/2009 | Young | .................. G06T 3/4069 382/280 |

(Continued)

OTHER PUBLICATIONS

Eric, T., et al., "Elastic registration of MRI scans using Fast DCT," Proceedings of the 22nd Annual EMBS International Conference, Jul. 23-28, 2000, Chicago IL.*

(Continued)

*Primary Examiner* — Xuemei Chen
(74) *Attorney, Agent, or Firm* — Canon U.S.A., Inc. IP Division

(57) ABSTRACT

A method for registering images aligns a fixed image with a corresponding moving image. A target image and a reference image are selected. The reference and target images are relatively low-res representations of the fixed and moving images respectively. A current image distortion map is determined that defines distortions between the target and reference images. A residual image is determined by comparing the reference image and a warped target image derived from the target image based on the current image distortion map. A residual image distortion map is determined based on transform coefficients of cosine functions fitted to the residual image. The coefficients are determined by applying a DCT to a signal formed by the residual image (Continued)

and image gradients of the warped target or reference image. The current image distortion map is combined with the residual image distortion map to align the fixed image and the moving image.

19 Claims, 8 Drawing Sheets

(56) References Cited

U.S. PATENT DOCUMENTS

| | | | | |
|---|---|---|---|---|
| 7,822,231 | B2* | 10/2010 | Coimbra | H04N 19/51 382/107 |
| 7,840,095 | B2* | 11/2010 | Yamada | G06T 3/4053 348/152 |
| 7,889,905 | B2* | 2/2011 | Higgins | A61B 1/00147 382/130 |
| 8,064,664 | B2* | 11/2011 | Suri | G06K 9/6206 382/128 |
| 8,203,607 | B2* | 6/2012 | Sabuncu | G06T 7/35 348/135 |
| 8,355,534 | B2* | 1/2013 | Gaddy | G06T 7/207 382/103 |
| 8,705,881 | B2* | 4/2014 | Wang | G06T 5/003 382/255 |
| 9,626,770 | B2* | 4/2017 | Taggart | G06K 9/00711 |
| 2005/0162565 | A1* | 7/2005 | Zhen | H04N 5/145 348/700 |
| 2005/0242568 | A1* | 11/2005 | Long | G07D 7/20 283/72 |
| 2007/0086678 | A1* | 4/2007 | Chefd'hotel | G06K 9/6289 382/294 |
| 2008/0019611 | A1* | 1/2008 | Larkin | G06K 9/6203 382/287 |
| 2010/0150472 | A1* | 6/2010 | Chen | G02B 21/008 382/278 |
| 2010/0302606 | A1* | 12/2010 | Fletcher | H04N 1/00002 358/474 |
| 2017/0206671 | A1* | 7/2017 | Pollard | G06T 7/37 |

OTHER PUBLICATIONS

Lefebure, M., "Image Registration, Optical Flow and Local Rigidity," Journal of Mathematical Imaging and Vision 14: 131-147, 2001.*

Bruce D. Lucas, Takeo Kanade, An Iterative Image Registration Technique with an Application to Stereo Vision, Proceedings of the 7th International Joint Conference on Artificial Intelligence, IJCAI'81, Aug. 24, 1981, vol. 2, pp. 674-679, Morgan Kaufmann Publishers Inc. San Francisco, CA, 1981.

Simon Baker, Iain Matthews, Lucas-Kanade 20 Years on: A Unifying Framework, International Journal of Computer Vision, Feb. 2004, 56(3):221-255, Dordrecht, NL, 2004.

Bruce D. Lucas, Takeo Kanade, An Iterative Image Registration Technique with an Application to Stereo Vision, DARPA Proceedings of Imaging Understanding Workshop, Apr. 1981, pp. 121-130.

* cited by examiner

SYSTEMS AND METHODS FOR REGISTRATION OF IMAGES

REFERENCE TO RELATED PATENT APPLICATION(S)

This application claims the benefit under 35 U.S.C. § 119 of the filing date of Australian Patent Application No. 2015202937, filed May 29, 2015, hereby incorporated by reference in its entirety as if fully set forth herein.

TECHNICAL FIELD

The present disclosure relates to digital image processing and more particularly to registration of images, which are distorted relative to each other in a non-linear manner.

BACKGROUND

Image registration is the determination of a geometrical transformation that aligns points in one image of an object with corresponding points in another image of that object. Registration is often used to compare or integrate images obtained from different imaging modalities or align images obtained from the same modality. Registration finds application in many technology fields, such as image stitching (a process of combining multiple images to produce a segmented panorama or high-resolution image) and image stabilisation (a process to reduce blurring associated with the motion of a camera or other imaging device during exposure). Registration may also be employed as a pre-processing step for a wide range of classification and analysis applications such as image calibration, and depth estimation, measurement, and assessment by professionals.

Many applications of image registration are found in the area of medical imaging, where there are more medical image modalities than ever before. Generally, diagnosing based on medical images may involve piecing together information from multiple imaging modalities to make a clinical decision. It takes years of training to become an expert in the combination and interpretation of information from different medical images, and mistakes can be costly. Accordingly, more and more clinicians are relying on technology that can automatically stitch, register, and/or process medical images captured by the same modality or different modalities. Such image processing saves the clinician time and leads to better diagnoses.

One particular application of image registration can be found in digital pathology, which is an image-based information environment that allows management of information generated from digital slides. Digital pathology is enabled in part by virtual microscopy, which is the practice of converting glass slides into digital slides that can be viewed, managed, and analysed on a computer monitor. Virtual microscopy gives physicians the ability to navigate and observe a biological specimen at different simulated magnifications and through different views as though they were controlling a microscope. This is typically achieved using a display device such as a computer monitor or tablet with access to a database of digital slides of the specimen.

There are a number of advantages of virtual microscopy over traditional microscopy. The specimen itself is not required at the time of viewing, thereby facilitating archiving, telemedicine and education. Also, virtual microscopy can enable the processing of the specimen images to reveal pathological features that would be otherwise difficult to observe by eye, for example as part of a computer aided diagnosis system.

Furthermore, digital pathology is often applied to the analysis of histology specimens. A histology specimen may be prepared from a tissue sample by freezing it in paraffin and then slicing into sections. The slices may be stained to reveal particular features, and placed on a microscope slide under a cover slip. These specimen slides are then converted into digital slides by virtual microscopy. A clinician may subsequently examine several adjacent digital slides of the specimen tissue to assess the extent of a disease throughout the tissue. Accordingly, it is often desirable to align the digital slides so that a clinician can easily assess the tissue sample.

There may, however, be complex, nonlinear deformations between adjacent digital slides, which make registration of digital slides difficult. One such factor is the physical axial distance between the digital slides. For instance, if the axial distance between two adjacent sections is large, the digital slides of these sections may contain less common features. Another factor may be variations in the sections introduced when the sections are cut. For instance, striations (ridges), folds, tears, or other physical deformations may be introduced independently to the sections during cutting. A third factor may be variations in the sections caused by staining the section. For instance, different preparations applied to the tissue for staining may be different between sections and cause the same feature to appear quite differently when imaged.

In spite of the difficulties, a variety of registration methods may be employed to align digital slides including, optical or normal flow based methods (e.g. Horn and Schunk), information-theoretic methods (e.g. mutual information), cross-correlation-based methods, gradient based methods, and more recently methods that utilize advanced statistical methods from machine learning. Additionally, there are many ways to model the non-linear deformations that occur between images that either take into account a physical-based model of tissue deformations, such as elastic material deformation or fluid flow, or attempt to model the deformations using basis functions such as radial basis functions, wavelet transforms, and B-splines.

Most registration methods trade off processing speed against accuracy of registration. For example, mutual information is able to register images where the same structure has different intensity in both images (e.g. a CT scan and an MRI scan). However, calculation of standard mutual information is very slow. Many methods have been developed to speed up this calculation often at the expense of an accurate alignment; whereas, other methods have included more information to obtain higher-order mutual information and improved alignment accuracy at the expense of processing time.

In general, however, these methods scale poorly with image size and may be very slow for large images such as those produced by virtual microscopy. A need therefore exists for techniques to register large images rapidly with a high level of accuracy.

SUMMARY

It is the object of the present invention to substantially overcome or ameliorate one or more of the disadvantages of the prior art, or at least provide a useful alternative.

According to one aspect of the present disclosure, a method for determining an image distortion map is provided that defines distortions between a fixed image and a corresponding moving image. The method includes selecting a target image and a reference image. The target image is a relatively low resolution representation of the moving image and the reference image is a relatively low resolution representation of the fixed image. The method further includes determining a current image distortion map defining distortions between the target image and the reference image, determining a residual image by comparing the reference image and a warped target image derived from the target image based on the current image distortion map, and determining a residual image distortion map based on transform coefficients of cosine functions fitted to the residual image. The transform coefficients are determined by applying a discrete cosine transform to a signal formed by the residual image and image gradients of the warped target image or the reference image. The method further includes combining the current image distortion map with the residual image distortion map to align the fixed image and the moving image.

According to another aspect of the present disclosure, a method for determining an image distortion map is provided that defines a motion between a reference image and a corresponding target image. The method includes the steps of determining a current image distortion map defining distortions between the target image and the reference image, determining a residual image by comparing the reference image and a warped target image derived from the target image on a basis of the current image distortion map, and determining a residual image distortion map using a plurality of basis functions having transform coefficients determined by applying a discrete frequency transform to a signal formed based on the residual image and image gradients of the warped target image or the reference image. The method further includes combining the current image distortion map and the residual image distortion map to form an improved distortion map, wherein the improved distortion map is used to transform the target image for displaying on a display device.

According to yet another aspect of the present disclosure, a method for determining an image distortion map relating a fixed image and a corresponding moving image is provided. The method comprises (a) selecting a target image and a reference image. The target image is a relatively low resolution representation of the moving image and the reference image is a relatively low resolution representation of the fixed image. The method further comprises (b) determining an initial distortion map defining distortions between the target image and the corresponding reference image, (c) using the initial distortion map to derive an initial warped target image from the target image, and (d) determining current transform coefficients by calculating a discrete frequency transform for a residual image and image gradients in the initial warped target image. The residual image is formed by comparing the reference image and the initial warped target image. The method further includes (e) filtering the determined current transform coefficients to form a current residual image distortion map, and (f) determining an improved image distortion map using the initial image distortion map and the current residual image distortion map weighted by a current convergence factor. The current convergence factor is determined on a basis of at least two previous sets of transform coefficients. Furthermore, the method includes (g) applying the determined further image distortion map to the target image to derive a further warped target image, and repeating steps (d)-(g) for a predetermined number of iterations to determine the image distortion map.

According to another aspect of the present disclosure, a method for aligning a reference image and a target image is provided. The method includes receiving a first value of a numerical representation of a first plurality of motion vectors between the first image and the second image, and receiving a subsequent value of the numerical representation of a subsequent plurality of motion vector between the first image and the second image. The method also includes calculating a ratio of a difference between the first and subsequent value and a sum of the first and subsequent value, and comparing the ratio with a threshold value to determine whether the process of iteratively aligning the target image to the reference image is converging or diverging, wherein the subsequent plurality of motion vectors are adjusted in response to the determination to align the target image to the reference image.

According to yet another aspect of the present disclosure, a method for aligning a reference image and target image is provided. The method includes iteratively aligning the target image to the reference image to determine a first plurality of motion vectors and a second plurality of motion vectors, wherein the second plurality of motion vectors is determined in a subsequent iteration of aligning the target image to the reference image and combining motion vectors of the first plurality of motion vectors in accordance with a predetermined pattern to generate a first iteration characteristic value associated with a first iteration of aligning the target image and the reference image. The method also includes combining motion vectors of the second plurality of motion vectors in accordance with a predetermined pattern to generate a second iteration characteristic value associated with the subsequent iteration of aligning the target image and the reference image, calculating a ratio of a difference between the first and second iteration characteristic values and a sum of the first and second iteration characteristic values, and comparing the ratio with a threshold value to determine whether the process of iteratively aligning the target image to the reference image is converging or diverging. The second plurality of motion vectors are adjusted in response to the determination to align the target image to the reference image.

BRIEF DESCRIPTION OF THE DRAWINGS

At least one embodiment of the present invention will now be described with reference to the following drawings, in which.

DETAILED DESCRIPTION

The systems and method described herein may be applied to register and view digital images and more particularly to determine an image distortion map used to register one image to another. A first image, which is not altered and taken as a reference, is referred to as the "fixed" image. A second image, which is transformed so as to register it to the first, is referred to as the "moving" image. Aspects of the present disclosure will be described with reference to digital pathology. However, it should be understood that the system and methods described herein may be utilized to determine an image distortion map for any other type of high resolution digital images without departing from the scope of the present disclosure.

Figure 1:
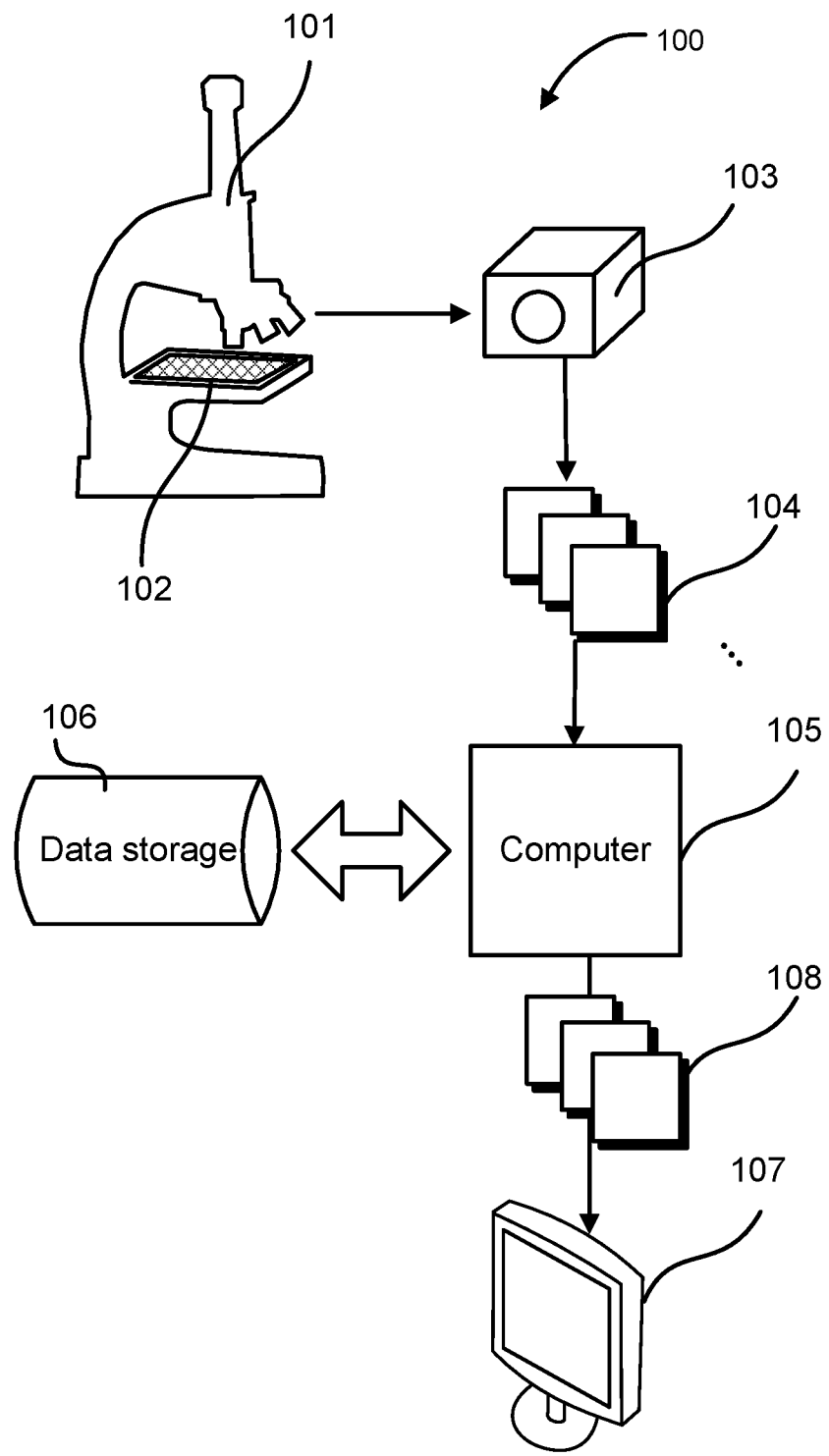
FIG. 1 is a schematic illustrating a general microscope capture system for the inspection of a set of specimen slides.

FIG. 1 is a schematic diagram illustrating a typical microscope capture system 100 for the inspection of specimen slides 102. The microscope capture system 100 includes a microscope 101, a sensor 103, a computer module 105, a data storage device 106 and a display 107.

The microscope 101 is employed to view one or more slices prepared from a specimen and placed upon slides 102 for viewing. Each slide 102 may include a thin slice/section of a biological tissue fixed in a substrate. In some cases the slices may be semi-transparent and/or stained to highlight specific features similar to a histology slide. Commonly, the slices used to prepare specimen slides 102 are taken at regular intervals through the specimen tissue, and are often immediately adjacent slices. Alternatively the slices may be unevenly sampled, and in some cases the same slice of tissue may be used on more than one specimen slide 102, for example with different staining.

The specimen slide 102 may include a variety of biological features on a wide range of scales which depend on the specific tissue sample and stain used to create the slide 102. In one example, the dimensions of the specimen on the slide 102 may be of the order of 10 mm×10 mm or larger. If the transverse resolution of a virtual slide is selected as 0.2 µm, each corresponding digital image would comprise of at least 50,000 by 50,000 pixels.

For capturing microscopic images, a specimen slide 102 is selected from a set of slides prepared for a particular specimen and positioned on a movable stage under a lens of the microscope 101. The sensor 103, mounted on the microscope 101, captures an image of the specimen section in the field of view of the lens. In some cases, the specimen section on the slide 102 may have a spatial extent larger than the field of view of the microscope 101 in any or all directions. In these cases, the moveable stage of the microscope 102 may move in the required directions to capture the full specimen section. Particularly, the sensor 103 may capture multiple overlapping images of the specimen at each stage as the moveable stage moves to view the entire specimen. The multiple images can be captured with different optical settings or by using different types of illumination. These captured images 104 are passed to the computer module 105, which generates a virtual slide image 108.

In case multiple images are captured for a specimen slide, the computer module 105 stitches the individual images 104 together seamlessly to form a virtual slide image 108. The resulting virtual slide image 108 may define a large image of a single layer of the specimen at high resolution and may be stored in the data storage device 106.

Once a first specimen slide 102 has been imaged, a second specimen slide 102 is selected from the set of slides and placed under the lens of the microscope 101. The specimen on the slide 102 is imaged in a similar fashion to the first slide to generate a second virtual slide image 108 that may be stored in the data storage device 106. The next specimen slide may then be selected and imaged to form a third virtual slide image 108, and so on until all the slides 102 corresponding to a tissue sample are converted into virtual slide images 108.

The computer module 105 subsequently employs an image registration method 200, according to aspects of the present disclosure, to align a pair of virtual slide images 108 so that they may be presented to a user such that common features are aligned to aid analysis of the virtual slide images 108.

The display system 107 displays the whole or parts of the virtual slide images 108. The computer module 105 can additionally process the information on the virtual slide image 108 before presentation to the user to enhance the image. This processing could take the form of changing the image appearance to give diagnostic assistance to the user, and/or other potential enhancements. Furthermore, the display system 107 may display one or more virtual slide images 108 simultaneously.

Figure 7A:
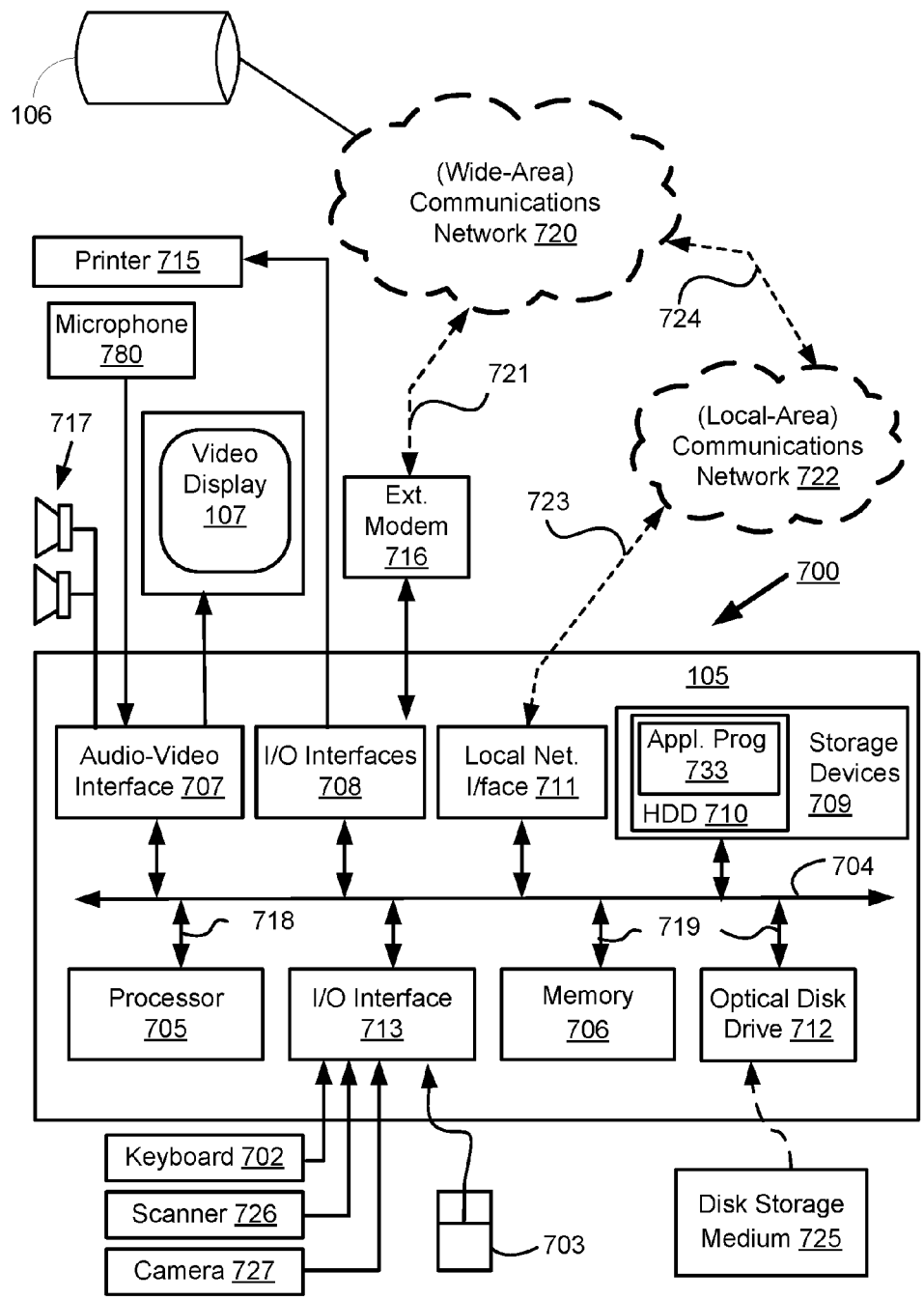
FIGS. 7A and 7B form a schematic block diagram of a general purpose computer system upon which arrangements described can be practiced.
Figure 7B:
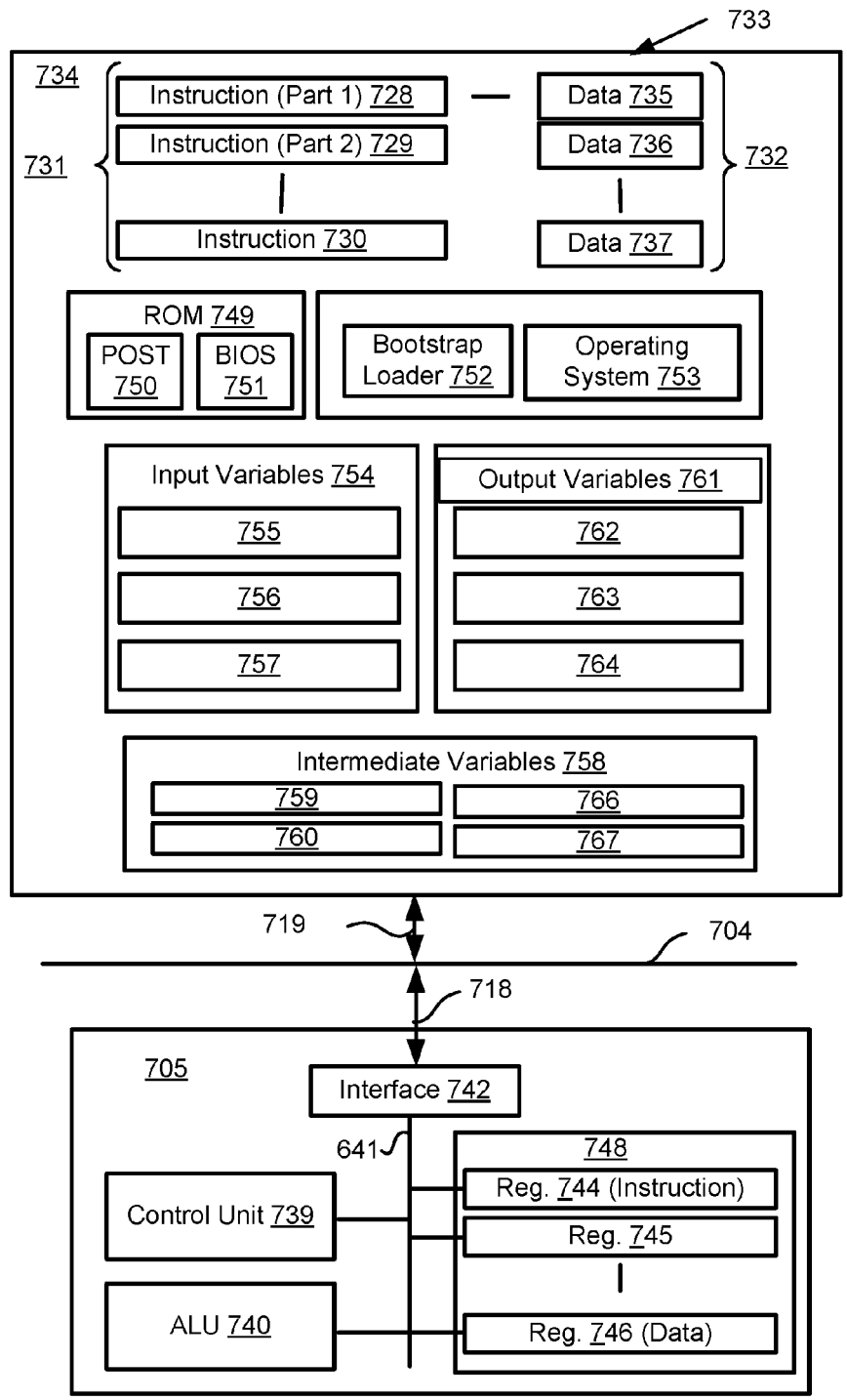

FIGS. 7A and 7B depict a computer system 700, upon which the various arrangements and method described in this disclosure can be practiced.

As seen in FIG. 7A, the computer system 700 includes the computer module 105, one or more input devices such as a keyboard 702, a mouse pointer device 703, a scanner 726, the sensor 103, and a microphone 780. The computer system 700 may also include output devices including a printer 715, the display device 107 and loudspeakers 717. An external Modulator-Demodulator (Modem) transceiver device 716 may be used by the computer module 105 for communicating to and from a communications network 720 via a connection 721. The communications network 720 may be a wide-area network (WAN), such as the Internet, a cellular telecommunications network, or a private WAN. Where the connection 721 is a telephone line, the modem 716 may be a traditional "dial-up" modem. Alternatively, where the connection 721 is a high capacity (e.g., cable) connection, the modem 716 may be a broadband modem. A wireless modem may also be used for wireless connection to the communications network 720. As desired in some implementations, the sensor 103 may couple directly to the network 720 via which the virtual slide images 108 are transferred to the computer 105. In this fashion the computer 105 may be a server-type device implemented in a cloud-computing environment for image processing.

The computer module 105 typically includes at least one processor unit 705, and a memory unit 706. For example, the memory unit 706 may have semiconductor random access memory (RAM) and semiconductor read only memory (ROM). The computer module 105 also includes an number of input/output (I/O) interfaces including: an audio-video interface 707 that couples to the video display 107, loudspeakers 717 and microphone 780; an I/O interface 713 that couples to the keyboard 702, mouse 703, scanner 726, sensor 103 and optionally a joystick or other human interface device (not illustrated); and an interface 708 for the external modem 716 and printer 715. In some implementations, the modem 716 may be incorporated within the computer module 105, for example within the interface 708. The computer module 105 also has a local network interface 711, which permits coupling of the computer system 700 via a connection 723 to a local-area communications network 722, known as a Local Area Network (LAN). As illustrated in FIG. 7A, the local communications network 722 may also couple to the wide network 720 via a connection 724, which would typically include a so-called "firewall" device or device of similar functionality. The local network interface 711 may comprise an Ethernet circuit card, a Bluetooth™ wireless arrangement or an IEEE 802.11 wireless arrangement; however, numerous other types of interfaces may be practiced for the interface 711.

Where desired or appropriate, the control connection 109 between the computer module 105 and the moving stage of the microscope 101 may be via a connection to either of the networks 720 or 722 or via a direct connection (not illustrated) to the I/O interface 713 for example.

The I/O interfaces 708 and 713 may afford either or both of serial and parallel connectivity, the former typically being implemented according to the Universal Serial Bus (USB) standards and having corresponding USB connectors (not illustrated). Storage devices 709 are provided and typically include a hard disk drive (HDD) 710. Other storage devices such as a floppy disk drive and a magnetic tape drive (not illustrated) may also be used. An optical disk drive 712 is typically provided to act as a non-volatile source of data. Portable memory devices, such optical disks (e.g., CD-ROM, DVD, Blu-ray USB-RAM, portable, external hard drives, and floppy disks, for example, may be used as appropriate sources of data to the system 700. With reference to the arrangement of FIG. 1, the data storage 106 may be implemented using the HDD 710, the memory 706, or in a remote fashion upon either one or both of the networks 720 and 722.

The components 705 to 713 of the computer module 105 typically communicate via an interconnected bus 704 and in a manner that results in a conventional mode of operation of the computer system 700 known to those in the relevant art. For example, the processor 705 is coupled to the system bus 704 using a connection 718. Likewise, the memory 706 and optical disk drive 712 are coupled to the system bus 704 by connections 719. Examples of computers on which the described arrangements can be practised include IBM-PC's and compatibles, Sun Sparcstations, Apple Mac™ or a like computer systems.

The methods of registering images and determining image distortion maps to be described may be implemented using the computer system 700 wherein the processes of FIGS. 2 to 6 may be implemented as one or more software application programs 733 executable within the computer system 700, and particularly upon the computer 105. In particular, the steps of the methods are effected by instructions 731 (see FIG. 7B) in the software 733 that are carried out within the computer system 700. The software instructions 731 may be formed as one or more code modules, each for performing one or more particular tasks. The software may also be divided into two separate parts, in which a first part and the corresponding code modules performs the image registration and processing methods and a second part and the corresponding code modules manage a user interface between the first part and the user.

The software may be stored in a computer readable medium, including the storage devices described below, for example. The software is loaded into the computer system 700 from the computer readable medium, and then executed by the computer system 700. A computer readable medium having such software or computer program recorded on the computer readable medium is a computer program product. The use of the computer program product in the computer system 700 preferably effects an advantageous apparatus for image registration.

The software 733 is typically stored in the HDD 710 or the memory 706. The software is loaded into the computer system 700 from a computer readable medium, and executed by the computer system 700. Thus, for example, the software 733 may be stored on an optically readable disk storage medium (e.g., CD-ROM) 725 that is read by the optical disk drive 712. A computer readable medium having such software or computer program recorded on it is a computer program product. The use of the computer program product in the computer system 700 preferably effects an apparatus for registration by determining an image distortion map.

In some instances, the application programs 733 may be supplied to the user encoded on one or more CD-ROMs 725 and read via the corresponding drive 712, or alternatively may be read by the user from the networks 720 or 722. Still further, the software can also be loaded into the computer system 700 from other computer readable media. Computer readable storage media refers to any non-transitory tangible storage medium that provides recorded instructions and/or data to the computer system 700 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 105. Examples of transitory or non-tangible computer readable transmission media that may also participate in the provision of software, application programs, instructions and/or data to the computer module 105 include radio or infra-red transmission channels as well as a network connection to another computer or networked device, and the Internet or Intranets including e-mail transmissions and information recorded on Websites and the like.

The second part of the application programs 733 and the corresponding code modules mentioned above may be executed to implement one or more graphical user interfaces (GUIs) to be rendered or otherwise represented upon the display 107. Through manipulation of typically the keyboard 702 and the mouse 703, a user of the computer system 700 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 717 and user voice commands input via the microphone 780.

FIG. 7B is a detailed schematic block diagram of the processor 705 and a "memory" 734. The memory 734 represents a logical aggregation of all the memory modules (including the storage module 106, HDD 709 and semiconductor memory 706) that can be accessed by the computer module 105 in FIG. 7A.

When the computer module 105 is initially powered up, a power-on self-test (POST) program 750 executes. The POST program 750 is typically stored in a ROM 749 of the semiconductor memory 706 of FIG. 7A. A hardware device such as the ROM 749 storing software is sometimes referred to as firmware. The POST program 750 examines hardware within the computer module 105 to ensure proper functioning and typically checks the processor 705, the memory 734 (709, 706), and a basic input-output systems software (BIOS) module 751, also typically stored in the ROM 749, for correct operation. Once the POST program 750 has run successfully, the BIOS 751 activates the hard disk drive 710 of FIG. 7A. Activation of the hard disk drive 710 causes a bootstrap loader program 752 that is resident on the hard disk drive 710 to execute via the processor 705. This loads an operating system 753 into the RAM memory 706, upon which the operating system 753 commences operation. The operating system 753 is a system level application, executable by the processor 705, to fulfil various high level functions, including processor management, memory management, device management, storage management, software application interface, and generic user interface.

The operating system 753 manages the memory 734 (709, 706) to ensure that each process or application running on the computer module 105 has sufficient memory in which to execute without colliding with memory allocated to another process. Furthermore, the different types of memory available in the system 700 of FIG. 7A must be used properly so that each process can run effectively. Accordingly, the aggregated memory 734 is not intended to illustrate how particular segments of memory are allocated (unless otherwise stated), but rather to provide a general view of the memory accessible by the computer system 700 and how such is used.

As shown in FIG. 7B, the processor 705 includes a number of functional modules including a control unit 739, an arithmetic logic unit (ALU) 740, and a local or internal memory 748, sometimes called a cache memory. The cache memory 748 typically includes a number of storage registers 744-746 in a register section. One or more internal busses 741 functionally interconnect these functional modules. The processor 705 typically also has one or more interfaces 742 for communicating with external devices via the system bus 704, using a connection 718. The memory 734 is coupled to the bus 704 using a connection 719.

The application program 733 includes a sequence of instructions 731 that may include conditional branch and loop instructions. The program 733 may also include data 732, which is used in execution of the program 733. The instructions 731 and the data 732 are stored in memory locations 728, 729, 730 and 735, 736, 737, respectively. Depending upon the relative size of the instructions 731 and the memory locations 728-730, a particular instruction may be stored in a single memory location as depicted by the instruction shown in the memory location 730. Alternately, an instruction may be segmented into a number of parts each of which is stored in a separate memory location, as depicted by the instruction segments shown in the memory locations 728 and 729.

In general, the processor 705 is given a set of instructions, which are executed therein. The processor 705 waits for a subsequent input, to which the processor 705 reacts to by executing another set of instructions. Each input may be provided from one or more of a number of sources, including data generated by one or more of the input devices 702, 703, data received from an external source across one of the networks 720, 702, data retrieved from one of the storage devices 706, 709 or data retrieved from a storage medium 725 inserted into the corresponding reader 712, all depicted in FIG. 7A. The execution of a set of the instructions may in some cases result in output of data. Execution may also involve storing data or variables to the memory 734.

The disclosed image registration and image distortion map generating arrangements use input variables 754, which are stored in the memory 734 in corresponding memory locations 755, 756, 757. The arrangements produce output variables 761, which are stored in the memory 734 in corresponding memory locations 762, 763, 764. Intermediate variables 758 may be stored in memory locations 759, 760, 766 and 767.

Referring to the processor 705 of FIG. 7B, the registers 744, 745, 746, the arithmetic logic unit (ALU) 740, and the control unit 739 work together to perform sequences of micro-operations needed to perform "fetch, decode, and execute" cycles for every instruction in the instruction set making up the program 733. Each fetch, decode, and execute cycle comprises:

(i) a fetch operation, which fetches or reads an instruction 731 from a memory location 728, 729, 730;

(ii) a decode operation in which the control unit 739 determines which instruction has been fetched; and (iii) an execute operation in which the control unit 739 and/or the ALU 740 execute the instruction.

Thereafter, a further fetch, decode, and execute cycle for the next instruction may be executed. Similarly, a store cycle may be performed by which the control unit 739 stores or writes a value to a memory location 732.

Each step or sub-process in the processes of FIGS. 2 to 6 is associated with one or more segments of the program 733 and is performed by the register section 744, 745, 747, the ALU 740, and the control unit 739 in the processor 705 working together to perform the fetch, decode, and execute cycles for every instruction in the instruction set for the noted segments of the program 733.

FIGS. 2-6 are flowcharts illustrating methods 200, 300, 400, 500 and 600 for registering images and determining an image distortion map. These methods will be described with reference to FIGS. 7A and 7B. In one arrangement, the steps of the methods 200-600 may be implemented as one or more software code modules of the software application program 733 resident in the ROM 760 and being controlled in execution by the processor 705 of the system 700. Moreover, one or more method steps may be deleted, added, or reordered without departing from the scope of the present disclosure.

Figure 2:
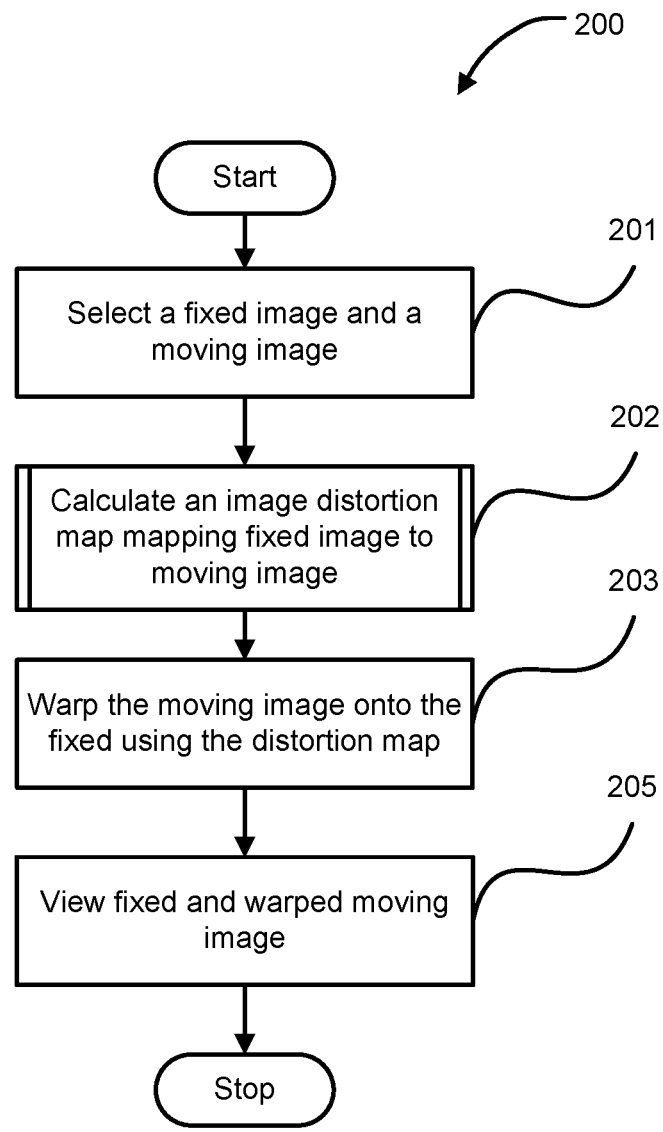
FIG. 2 is a flowchart illustrating an exemplary method for image registration.

FIG. 2 is a flowchart illustrating an exemplary method for image registration according to aspects of the present disclosure.

The method begins at step 201, where two virtual slide images 108 pertaining to a particular tissue specimen are retrieved from the image capturing system 100. One of the retrieved virtual image slides is selected as a first image (hereafter referred to as a "moving image m"), while the other virtual slide image is selected as a second image (hereafter referred to as a "fixed image f"). The fixed image forms a spatial reference, or anchor, to which the moving image m is registered by transforming its pixels by a process of image warping. According to one aspect of the present disclosure, if the original fixed and moving images f and m are colour or multi-spectral in nature, they may be converted to grayscale to simplify further processing.

The fixed image f can be selected in several ways. For example, the virtual image slides 108 having higher quality and/or lower spatial distortion may be selected as the fixed image f. Alternatively, the first virtual image slide 108 may simply be selected as the fixed image and the second virtual image slide may be selected as the moving image.

Subsequently, an image distortion map is calculated according to aspects of the present disclosure, at step 202. The image distortion map when applied to the moving image allows the moving image m to be distorted in such a way that its pixels are registered with the pixels of the fixed image f. In the method described, an "inverse" warping algorithm is used to determine the image distortion map, which gives a pixel-by-pixel mapping from the fixed image f to the moving image m.

The image distortion map is represented as a relative displacement from an identity transformation. Therefore an image distortion map representing an identity transformation would contain only zero vectors. With the image distortion represented in this fashion, the average magnitude of vectors in the image distortion map provides an indication of how close the image distortion is to an identity transformation. For example, if the average magnitude of vectors in an image distortion map is 1 pixel, then the average displacement of pixels distorted during the registration process is also 1 pixel.

To utilize this distortion for mapping, a vector image J of pixels is added to the image distortion map, where $$J(x, y) = \begin{pmatrix} x \\ y \end{pmatrix} \quad [1]$$

According to one implementation, the image distortion map itself may also be represented in a down-sampled form in which the mapping is not read directly from the image distortion map, but is interpolated from values in a low-resolution image distortion map. For large images, this approach can save memory and processing time. Determination of the image distortion map is described in detail with reference to FIGS. 3-6.

At step 203 the moving image m is warped based on the image distortion map by mapping positions from every pixel coordinate in the fixed image f to coordinates in the moving image m. Subsequently, pixel values are interpolated in the moving image m using the mapped positions, and a distorted image is constructed of the same size as the fixed image f that contains interpolated values from the moving image m. Cubic interpolation is used for interpolation during warping and produces acceptable image quality. However, it will be understood that other interpolation techniques, such as bilinear, sinc or spline interpolation may also be used without departing from the scope of the present disclosure.

Upon calculation of the warped moving image, further processing can occur on the registered moving image, or the two images (i.e., the fixed image and the registered moving image) may be viewed 205 alternately by switching between the two images with their features aligned.

The fixed and moving images f and m are typically high-resolution representations of a specimen slide 102, and the size of these images can be extremely large. For instance, the size of the fixed and moving images may be anywhere between hundreds of megapixels and a few gigabytes in size. Furthermore, the misalignment between the two images may be non-linear in nature.

Directly registering such large-sized images having non-linear deformations is difficult. It has been noted that non-linear distortions are estimated most effectively and quickly when the misalignment between images is only a few pixels and the image size is small. Accordingly, aspects of the present disclosure down-sample the fixed and moving images before performing registration. Specifically, the image distortion map is calculated based on an image pyramid including a list of successively down-sampled images. The lowest resolution images are registered first, which produces a low-resolution image distortion estimate. This estimate can be used to assist in calculating progressively higher resolution image distortion maps that include finer details. In some cases, a rigid transformation is estimated for the fixed and moving images before commencing estimation of any non-linear image distortion. A rigid transformation is a function modelled by a small number of parameters, such as a pure translation, a rotation/scaling/translation transform, an affine transform, or a projective transform. Because rigid registration algorithms do not require any assumptions about how closely registered a pair of input images are, these registration algorithms can be performed at any resolution. Accordingly, in one implementation of the present disclosure, the registration algorithm is performed at a resolution, which balances registration accuracy against computation time.

One method for performing rigid registration includes estimating rotation, scaling and translation by calculating Fourier magnitude images of the selected down-sampled moving and fixed image (which is translation invariant, because translations modify only the Fourier phase), transforming each Fourier magnitude image onto a log-polar (log r, θ) coordinate system (in which image rotation and image scaling become translations), and correlating the two log-polar Fourier magnitude images to yield a correlation peak. The correlation peak appears at a position that gives the relative scaling and rotation between the two images. Transforming the moving image accordingly by rotation and scaling aligns the moving image to the fixed image by the same orientation and scale factor. Performing a subsequent correlation determines a relative translation between the two images. Note that because the Fourier magnitude is an even function, this method includes an inherent ambiguity of 180°, which should not affect registration of images according to the present disclosure where rotation angles are expected to be close to 0°.

It has been found that an image size of 256×256, or 64K pixels gives a good performance with this type of rigid transformation. It will be understood however, that any other resolution of images may be selected just as easily without departing from the scope of the present disclosure.

Figure 3:
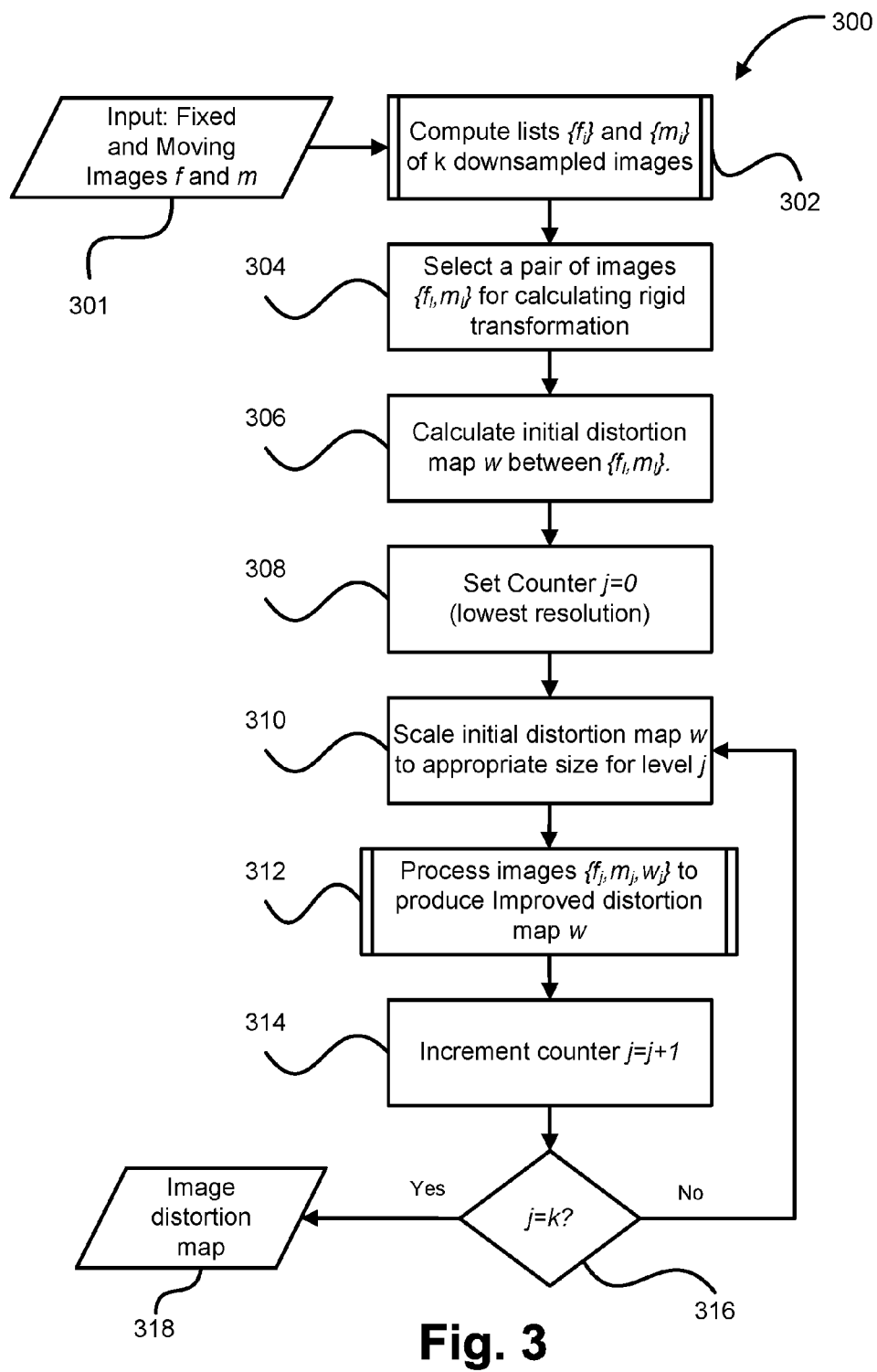
FIG. 3 is a flowchart illustrating a method for determining an image distortion map defining distortions between a fixed image and a moving image applying a course to fine refinement.

FIG. 3 is a flowchart illustrating an exemplary method 300 for determining an image distortion map defining distortions between a fixed image and a moving image according to step 202 of FIG. 2.

The input to method 300 is the pair of fixed and moving images, f and m selected in step 201 of FIG. 2.

The method begins at step 302 where the fixed and moving images are down-sampled. In one aspect, the down-sampling is performed by filtering and resampling the input images using a separable windowed sinc filter. However, it will be appreciated that any other down-sampling technique known in the art may be utilized without departing from the scope of the present disclosure. For example, down-sampling could be performed using a wavelet filter. Alternatively, downsampling can be performed using a frequency transform such as the FFT by performing a forward transform, discarding high frequency coefficients and performing an inverse transform on a reduced number of coefficients covering the lower frequencies.

Subsequently, a list of down-sampled images is generated for each of the fixed and moving images. The list of low resolution representations of fixed images are referred to as reference images and the list of low resolution representations of moving images are referred to as target images. Each list may include k images, and each image in each list may include a resampling of the original fixed or moving image with a down-sampling rate ranging from $2^{k+h-1}$ pixels per sample for the lowest resolution image in the list up to $2^h$ for the highest resolution image in the list. As the downsampling is accomplished by halving and resampling the fixed or moving image, h is the initial number of halvings used to obtain image k−1 in the list, and k the total number of images generated by successively halving the fixed or moving image. The parameter h is chosen to provide the required speed/accuracy trade-off of the algorithm at the highest resolution, and h+k−1 is chosen to provide the minimum useful image size for coarse alignment at the lowest resolution.

The resolution of the lowest resolution image in each list may be chosen such that the non-linear distortion estimation can improve registration estimates while operating as quickly as practicable. For example, an image size of around 64×64 or 4K pixels has been found to be appropriate as minimum resolution.

The resolution of the highest resolution image in each list is selected to provide the appropriate level of accuracy for the available computation time, noting that each successive level approximately quadruples the time required for each iteration of the algorithm.

At step 304, a pair of images $\{m_j, f_i\}$ (hereinafter referred to as a target image and reference image, respectively) having a relatively low resolution is selected from the list of down-sampled images at a resolution appropriate for evaluating a rigid distortion estimate between the two images. For instance, in case the desired size is 64K pixels, the target and reference images are selected that are closest in size to the desired size.

These two down-sampled images are used in step 306 to estimate a rigid transformation, e.g. linear rotation, scale and translation between the two images. From the rigid transformation, an initial image distortion map w can be constructed which approximately registers the target image to the reference image by filling the distortion map with coordinates obtained by evaluating the rigid transformation on coordinates representing an identity transformation. One way to evaluate the rigid transformation coordinates is by representing the transformation as an affine transformation, though any other known method may also be employed.

At step 308, a loop is initialized to calculate progressively more accurate image distortion maps w using the sequence of down-sampled images. Initially, the loop counter j is initialized to zero, indexing the lowest-resolution reference and target images ($f_0$, $m_0$).

Subsequently, at step 310, a current distortion map is scaled to match the size of the pair of images currently being processed ($f_j$, $m_j$). For instance, when the loop counter is initialized to zero, the initial image distortion map estimated in step 306 is scaled to match the size of the lowest resolution reference and target images. Alternatively, when the counter is incremented, the distortion map estimated in the previous cycle is scaled to match the size of the target and reference images currently being processed.

At step 312, an improved image distortion map is estimated based on the input reference and target images ($f_j$, $m_j$) and the scaled image distortion map $w_j$. This process is described in more detail with reference to FIGS. 4, 5, and 6.

Subsequently, at step 314, the loop counter is incremented, and if there are still more target and reference images to be processed, the current image distortion map w is passed back to step 310 and the estimation process is repeated with progressively higher-resolution images.

If all the target and reference images are processed from the list, the method proceeds to step 318 where the final scaled image distortion map is output.

The accuracy of estimation at each level can be a fraction of a pixel, so, depending upon the required accuracy, it is not necessary to repeat these refinement steps up to the full resolution available. For example, if a high-resolution image of breast tissue has a resolution of 0.2 μm per pixel, measuring a pair of sixteen down-sampled images, with a resolution of 3.2 μm per pixel, to an accuracy of 0.3 pixels is sufficient to attain a registration accuracy of 1 μm.

The actual accuracy of registration for any two images is dependent upon both the alignability of the textures being registered in the slides, and upon the degree of difference between the two slides being registered. While it is possible to measure alignment accuracy where ground truth is known, it is difficult to estimate the accuracy attained where no such ground truth is available.

Figure 4:
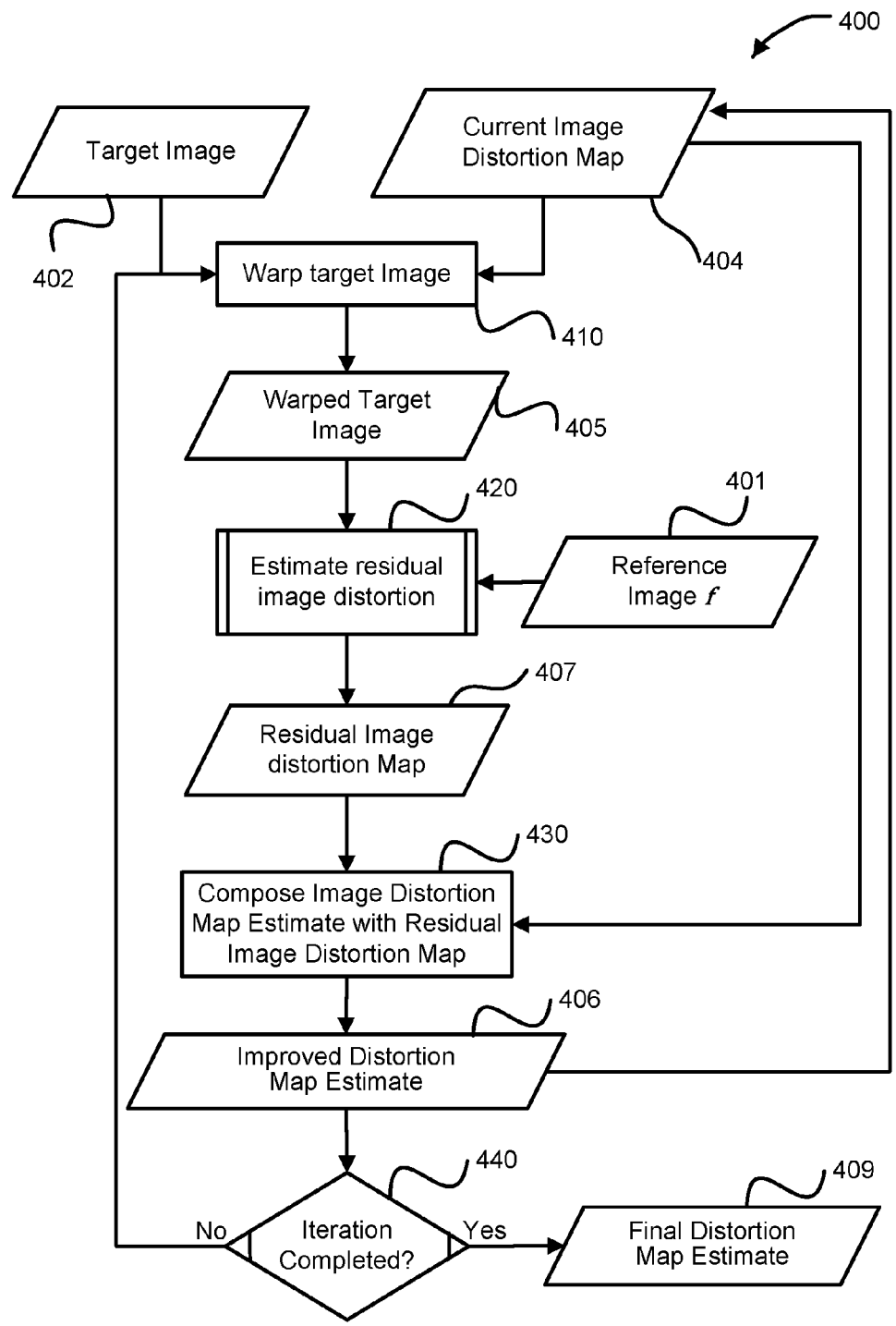
FIG. 4 is a flowchart illustrating an exemplary method for estimating an image distortion map defining distortion between a target image and a reference image at a particular resolution using an iterative refinement.

FIG. 4 is a flowchart illustrating a method for estimating an image distortion map according to step 312 in one single iteration of FIG. 3.

The method begins at step 410, where the selected down-sampled target image 402 is warped using the scaled current distortion map 404 (which was obtained in step 312 of the previous iteration in FIG. 3). Specifically, a warped target image 405 is produced by distorting the target image 402 based on the scaled distortion map estimate 404. The warped target image 405 represents a candidate version of the target image 402 registered with the reference image 401.

Subsequently, at step 420, the reference image 401 and the warped target image 405 are processed to estimate a residual image distortion map 407 between the two images 401,405, as further described in FIG. 5.

The scaled current distortion estimate 404 is composed with the estimated residual image distortion map 407, to produce an improved distortion estimate 406 which replaces the current distortion estimate 404. The operation of composing the scaled current distortion map with the residual image distortion map includes warping the scaled current distortion map using the residual image distortion map followed by adding the residual image distortion map to the result.

At step 440, it is determined whether the process should be terminated. This determination is based on three conditions. Firstly, if the process exceeds a predetermined number of iterations, the method is terminated so as not to exceed the allowable time. Secondly, if the residual image distortion map is smaller in average magnitude than a predetermined threshold, for example, 0.1 pixels, the process is regarded as having converged, and terminates. Thirdly, if the RMS difference between the warped target image m' and the reference image f does not decrease for a predetermined number of iterations, for example, three iterations, the process is regarded as having stagnated, and is terminated.

The number of iterations used depends upon the required accuracy and expected amount of distortion, but examples of a maximum number of iterations are 100 for the lowest-resolution images varying up to 10 iterations for the highest-resolution images.

If none of the conditions are met, the target image 402 is warped again based on the improved distortion estimate 406 and the process repeats until any one of the three conditions are met. When at least one condition is met and process completes, the improved distortion estimate 406 is returned as the final distortion estimate 409.

This final distortion estimate 409 can be used for a variety of purposes. If used to warp the moving image, then the fixed image and warped moving image can alternately be presented for display to a pathologist for examination, with common features between the two slices aligned and available for easy comparison. Aligning common features can also be used to assist in automated computer aided diagnosis over more than one slide, such as counting cells of a particular kind in a particular region of the image.

Figure 5:
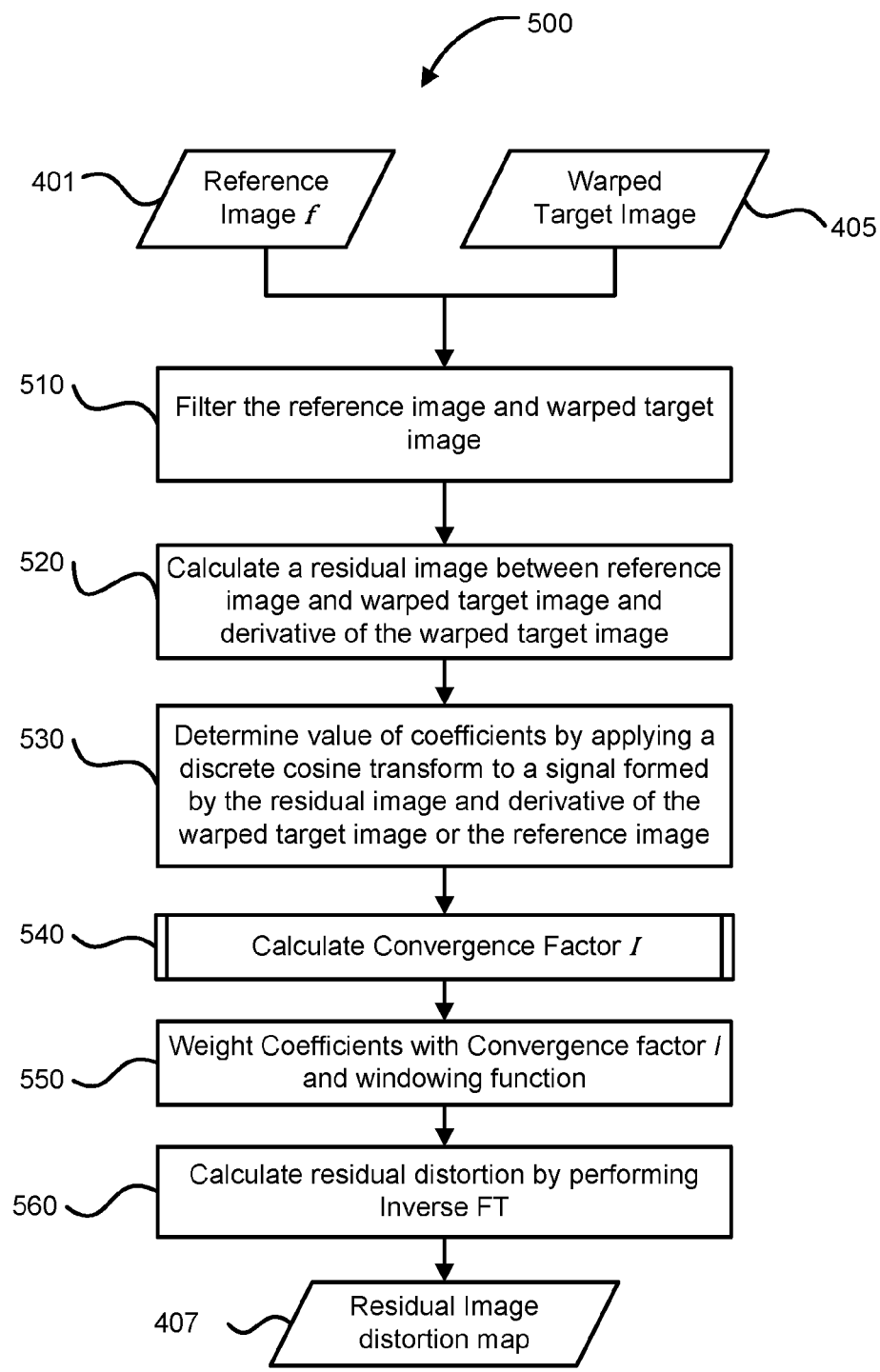
FIG. 5 is a flowchart illustrating an exemplary method for estimating a residual image distortion map between a fixed image and a warped target image that can be used in an iterative refinement process.

FIG. 5 is a flowchart illustrating a method 500 for estimating a residual image distortion map between the reference image 401 and the warped target image 405 according to step 420 of FIG. 4.

The method 500 calculates a "best possible" estimate U of the residual image distortion map relating the reference image and the warped target image m'405 such that m'((U+J)(x))≅f(x), and U is physically realistic, where m' is the warped target image and f is the reference image and J is given by equation [1].

One technique of obtaining the estimate U is to find an image distortion map $$w = \begin{bmatrix} w_x \\ w_y \end{bmatrix}$$

that minimizes the root mean square (RMS) difference between the reference image f and the warped target image m'((U+J)(x)), i.e., $$\operatorname*{argmin}_{w} \sum_{x,y} (m'((w+J)(x)) - f(x))^2 \quad [2]$$

However, this technique places no constraints upon how physically realistic the transformation w is, and the result of equation [2] may not be physically plausible.

The image distortion map w may be made more realistic by ensuring that the mapping is smooth, which can be achieved by representing the image distortion map w with a set of smooth basis functions, e.g. a set $\{\phi_{i,j}|i\in[0, P), j\in[0, Q)\}$ of M=P×Q smooth and orthonormal basis functions. The number of basis functions is chosen so as to provide a trade-off between RMS error and the smoothness of the image distortion map w. This representation is via transform coefficients $B_{i,j}$, $$B_{i,j} = \begin{bmatrix} B_{i,j}^x \\ B_{i,j}^y \end{bmatrix} \quad [3]$$

where $B_{i,j}$ is a vector of coefficients, describing the x and y transform domain components of the image distortion map, $$B_{i,j} = \Sigma_x \phi_{i,j}(x) w(x)$$

$$w(x) = \Sigma_{i,j} \phi^*_{i,j}(x) B_{i,j} \quad [4]$$

where $\phi_{i,j}^*(x)$ is a complex conjugate of $\phi_{i,j}$. If basis function is not complex, $\phi_{i,j} = \phi^*_{i,j}(x)$. In the preferred embodiment, $$\phi_{i,j} = c_{i,j} \cos\frac{2\pi i x}{X} \cos\frac{2\pi j y}{Y}$$

for each $i\in[0, P)$, $j\in[0, Q)$ with $c_{i,j}$ being a normalisation term. Further details in relation to basis functions are provided below with reference to equation [8].

Methods have been proposed for estimating the coefficients $B_{i,j}$, in particular using gradient-based approaches. A conventional least-squares solution is computationally expensive. For example, if there are M=P×Q basis functions and X×Y distortion map elements, a least-squares estimate of the coefficients $B_{i,j}$ requires time calculated as $O(M^3+M(X\times Y))$, a cost which is prohibitive for large images and many basis functions.

A simple example of a gradient-based approach to estimate displacement between the fixed and moving image is the following least-squares estimate of the displacement s. Between two one dimensional signals m and f this is expressed as:

$$s = \frac{\sum (m(x) - f(x))\frac{\partial f}{\partial x}}{\sum \left(\frac{\partial f}{\partial x}\right)^2}$$

This approach can be extended to two or more dimensions, and also applied to cropped sub-images or sub-signals to estimate translation locally.

A denser estimate of the distortion map can be obtained by dividing a signal or image into multiple segments $f_w$ and $m_w$, estimating a local displacement $s_w$ of each segment, and then constructing a dense distortion map by interpolating between the estimates.

$$s_w = \frac{\sum (m_w(x) - f_w(x))\frac{\partial f_w}{\partial x}}{\sum \left(\frac{\partial f_w}{\partial x}\right)^2} \quad [5]$$

However, this approach is problematic because there are often portions of a signal or image in which features suitable for alignment do not exist, therefore a gradient-based estimate may produce a poor estimate in some parts of the signal, resulting in a distortion map containing some regions with poor estimates.

Instead of using a gradient-based approach to combine estimates of local translation vectors to produce an estimate of a dense distortion map, aspects of the present disclosure utilize the gradient-based approach to generate a dense estimate of the distortion map by creating a function based on fitting multiple basis functions to a global distortion map. The advantage of such an approach is that a global fit might produce superior results in regions where alignable information does not exist, as the fitting process will produce a distortion map in such regions consistent with the more accurate fit in regions containing good alignable information.

Furthermore, an estimate of a fit of the coefficients $B_{i,j}$ to the distortion map can be calculated quickly by making a series of approximations. Specifically, by treating the x and y distortion map estimates as independent estimates, these distortion map estimates can be calculated separately. The following disclosure describes how the x distortion map is derived. The ty distortion map can be derived in a similar fashion.

An approximation using gradient-based methods to the least-squares fit of $B_{i,j}^x$ can be calculated thus:

$$B_{i,j}^x = \frac{\sum_{x,y} \phi_{i,j}\frac{\partial m'}{\partial x}(m' - f)}{\varepsilon + \sum_{x,y} \phi_{i,j}^2\left(\left(\frac{\partial m'}{\partial x}\right)^2 + \left(\frac{\partial m'}{\partial y}\right)^2\right)} \quad [6]$$

where $$\frac{\partial m'}{\partial x}$$

is the partial derivative of the moving image in the x direction, (m'−f) is the difference between the reference and the warped target image ("residual image") and ε is a regularization term to prevent division by zero and to limit estimates based upon measurements with extremely small values. The value of ε is unimportant if small enough. It has been found that with a value of ε=10$^{-9}$, numerical overflows can be prevented without otherwise affecting the calculation of the coefficients.

For convenience, the image gradient and difference parts of the numerator and denominator are defined as E and D respectively:

$$E = \frac{\partial m'}{\partial x}(m' - f) \qquad [7]$$

$$D = \left(\frac{\partial m'}{\partial x}\right)^2 + \left(\frac{\partial m'}{\partial y}\right)^2$$

Thus, by substituting E and D in equation [6], equation [6] can be written as—

$$B_{i,j}^x = \frac{\sum_{x,y} \phi_{i,j} E}{\sum_{x,y} \phi_{i,j}^2 D}$$

If the basis functions $\phi_{i,j}$ are the basis functions of discrete cosine transformation (DCT) coefficients, the basis functions can be defined as follows:

$$\phi_{i,j}(x, y) = c_{i,j} \cos\frac{2\pi ix}{X} \cos\frac{2\pi jy}{Y}, \qquad [8]$$

$$\text{where } c_{i,j} = \begin{cases} 1/\sqrt{XY} & (i = 0 \text{ and } j = 0) \\ \sqrt{2}/\sqrt{XY} & \begin{pmatrix} (i = 0 \text{ or } j = 0) \\ \text{and } i \ne j \end{pmatrix} \\ 2/\sqrt{XY} & (i \ne 0 \text{ and } j \ne 0) \end{cases}$$

Therefore, both the numerator and the denominator of equation [6] can be converted into a solvable form using DCT (where $k_1$, $k_2$, $k_3$, $k_4$ are constant coefficients which depend upon the values of i and j). Note that the numerator is determined by applying the discrete cosine transform to a combination of a partial derivative $$\frac{\partial m'}{\partial x}$$

of the warped target image m' and a residual image (m'−f) formed by subtracting the reference image f from the warped target image m'. The denominator, however, is determined by applying the discrete cosine transform to the sum of squared partial derivatives $$\frac{\partial m'}{\partial x}$$

and $$\frac{\partial m'}{\partial y}$$

of the warped target image m':

$$\sum_{x,y} \phi_{i,j} E = DCT_{i,j} E \qquad [9]$$

$$\sum_{x,y} \phi_{i,j}^2 D = \sum_{x,y} \left(c_{i,j} \cos\frac{2\pi ix}{X} \cos\frac{2\pi jy}{Y}\right)^2 D$$

$$= \sum_{x,y} \frac{c_{i,j}^2}{4} \left( \begin{array}{c} 1 + \cos\frac{4\pi ix}{X} + \cos\frac{4\pi jy}{Y} + \\ \cos\frac{4\pi ix}{X} \cos\frac{4\pi jy}{Y} \end{array} \right) D$$

$$= \frac{c_{i,j}^2}{4} \left( \begin{array}{c} \frac{DCT_{0,0}D}{c_{0,0}} + \frac{DCT_{2i,0}D}{c_{2i,0}} + \\ \frac{DCT_{0,2j}D}{c_{0,2j}} + \frac{DCT_{2i,2j}D}{c_{2i,2j}} \end{array} \right)$$

Thus, coefficients for basis functions $\phi_{i,j}(x, y)$ can be determined by applying DCT to a signal formed at least by a residual image and partial reference image derivatives taken at a plurality of locations within the reference image.

Note that the constant multipliers $c_{i,j}$ used to form an orthonormal transform are divided out of the DCT coefficients to produce the un-multiplied cosine terms. Therefore:

$$B_{i,j}^x = \frac{4}{c_{i,j}^2} \cdot \frac{DCT_{i,j}E}{\frac{DCT_{0,0}D}{c_{0,0}} + \frac{DCT_{2i,0}D}{c_{2i,0}} + \frac{DCT_{0,2j}D}{c_{0,2j}} + \frac{DCT_{2i,2j}D}{c_{2i,2j}}} \qquad [10]$$

By using equation [10], the coefficients $B_{i,j}^x$ can be calculated by a simple combination of coefficients calculated using DCTs of E and D. Note that in the preferred embodiment, the DCT transform is not implemented as a tiled transform over 8×8 blocks as it would be in an image compression algorithm. Rather it is used as a whole image or global transform.

In one aspect, all the basis coefficients are calculated. Alternatively, the basis coefficients are only calculated up to ⅛ of the Nyquist frequency along each axis to produce a distortion map of sufficient smoothness.

As is well-known, the DCT can be performed using efficient algorithms, requiring time O(N log N) instead of O(NM). Hence, each basis function coefficient $B_{i,j}^x$ can be calculated efficiently using fast DCT algorithms, where a basis function coefficient $B_{i,j}^x$ for a particular image is calculated by applying a cosine function having a frequency corresponding to the index i, j of that basis function coefficient $B_{i,j}^x$ to a plurality of values derived from that particular image.

Also, noting that the denominator term D is strictly positive, the term $DCT_{0,0}D$ must be larger than the other four DCT terms in the denominator expression. This allows one further approximation to be made, $$B_{i,j}^x = \frac{4c_{0,0}DCT_{i,j}E}{c_{i,j}^2 DCT_{0,0}D} \quad [11]$$

Using these formulations for computing a residual image distortion map results in a great increase in speed.

For example, assume we have an image containing 64M pixels (X=Y=8,192). 1M DCT coefficients provides an appropriately smooth fit to the distortion estimate (P=Q=1,024, up to one eighth the Nyquist frequency). While this number of coefficients provides a sufficiently smooth distortion estimate for digital pathology images, more or less coefficients might be chosen where more or less distortion is expected. In a preferred embodiment, only $1/64^{th}$ of the possible coefficients $B_{i,j}^x$ are used. This number of coefficients, representing a down-sampling by a factor of 8 in each direction, has been found to be appropriate to the datasets found in a target microscopy system. This number could be varied in other embodiments.

In one variation, the number of coefficients used to determine a smooth fit to the distortion estimate can vary depending on a degree of distortion of the target relative to the reference image. In a preferred embodiment, the degree of distortion is determined as the L2 norm of the derivative of the current image distortion map. If transition between motion vectors within the current distortion map is not smooth, i.e. the derivative of the distortion map is above the predetermined threshold, the choice of fewer coefficients is more suitable to the circumstances. In the preferred embodiment, if the degree of distortion exceeds 0.1 then the number of coefficients used to determine a smooth fit is further reduced by a factor of 2 in each direction.

In alternative embodiments, the degree of distortion may be determined using other norms or statistical measures such as a standard deviation of magnitude values of motion vectors defined by the initial image distortion map. Further, the number of coefficients used could be varied in a number of quantised steps or according to a continuous function. Finally, the threshold used should be varied based on the normalisation of image data ranges. It may also be tuned up or down as required by the application domain.

Using two fast frequency transforms to calculated the numerator DCT E and denominator DCT D of the expression used to calculate the basis functions, the number of operations required is reduced by a factor in the order of $3 \times 10^4$.

The process of generating an estimate of the residual image distortion is described with reference to FIG. 5.

The input to the process 500 is the reference image 401, and the warped target image 405. The output of method 500 is an estimate of a residual image distortion map 599.

At step 510, a low-pass filter is optionally applied to the reference image 401 and the warped target image 405 to assist convergence. A 1D windowed-sinc filter with nine taps applied separably is preferred but other low pass filters having linear or near linear phase could be used. For the lowest-resolution target and reference images in the hierarchy, bandwidth of the filter is selected to be half the Nyquist frequency, increasing up to full bandwidth for the highest-resolution target and reference images in the hierarchy.

Optionally, the filter kernel can be further based on the determined degree of distortion of the moving image relative to the fixed image. Thus, if the degree of distortion is above a predetermined threshold, it is desirable to a filter with narrow bandwidth.

At step 520, the differences (m'−f) and derivatives $$\left(\frac{\partial m'}{\partial x}, \frac{\partial m'}{\partial y}\right)$$

of the input images are calculated along with the numerator, $$E = \frac{\partial m'}{\partial x}(m' - f),$$

and denominator, $$D = \left(\frac{\partial m'}{\partial x}\right)^2 + \left(\frac{\partial m'}{\partial y}\right)^2,$$

terms described by equation [7]. The image gradients are calculated carefully, as they should be symmetrical with respect to each pixel at which they are calculated, and have a relatively flat spectrum. One way to calculate such image gradients is by convolution using a separable filter G, $$G(x, y) = \begin{cases} \frac{(1 + \cos 2\pi x \cdot 9)(\text{sinc}(x+\varepsilon) - \text{sinc}(x-\varepsilon))}{4\varepsilon}: & -3 \leq x \leq 3, y = 0 \\ 0: & \text{otherwise} \end{cases} \quad [12]$$

which is a Hanning window of width 9 pixels, with $$\varepsilon = \frac{1}{32},$$

thus G is a 7×1 Kernel and $$\frac{\partial m'}{\partial x} \cong f * G \quad [13]$$

The y derivative $$\frac{\partial m'}{\partial y}$$

is calculated similarly by separable convolution in the y direction. In an alternative embodiment a simple differencing operation such as is implemented by a Sobel operator may be used to calculate the partial derivatives.

Subsequently (at step 530), the coefficients $B_{i,j}^x$ are derived as previously described with respect to equations [10] or [11] using discrete cosine transforms. Thereafter, in step 540, the DCT coefficients calculated in step 530 are combined with DCT coefficients from previous iterations to calculate a convergence factor I, which is a constant multiplier for the DCT coefficients. This convergence factor gives an estimate of a degree of distortion between the fixed and moving images and provides stability during iteration. Calculation of the convergence factor is described later with reference to FIG. 6.

In step 550, the calculated coefficients are weighted and/or filtered to promote stability and reduce ringing. Note that the average magnitude of the DCT coefficients also gives an estimate of the degree of distortion of the image, and may in turn be used to select the amount of filtering applied to the coefficients to promote smooth convergence. Similarly, and equivalently, the magnitude of the vectors in the residual image distortion map might also be used for estimating a degree of distortion.

The convergence factor I attains a low value where the iteration is converging in an erratic fashion. The average magnitude of DCT coefficients or residual distortion vectors is larger with a high degree of distortion in the input image, thus weighting the DCT coefficients with I<1.0 will reduce the convergence step size for the iteration. More generally, the convergence step size can be varied by changing to the value of I.

At this point a frequency dependent weighting factor is also introduced to reduce the effect of spectral truncation. In the preferred embodiment this weighting is determined as a Hanning window though any other window along with weighting the coefficients by the convergence factor I may be used to reduce the ringing and promote stability. Alternatively, other filters such as a Gaussian window can be used to weight the transform coefficients in addition to the convergence factor I Thus at step 550, the basis coefficients calculated in step 530 are replaced by correctly weighted coefficients using the following expression:

$$B_{i,j} \leftarrow I \cdot B_{i,j} \left( \frac{\cos\frac{\pi i}{P} + 1.0}{2} \right) \left( \frac{\cos\frac{\pi j}{Q} + 1.0}{2} \right) \quad [14]$$

where I is the convergence factor, P is the number of coefficients to be calculated in the x direction, and Q is the number of coefficients to be calculated in the y direction such that $i \in [0, P)$, $j \in [0, Q)$. This expression has the effect of leaving low-frequency coefficients unaltered and attenuating high-frequency coefficients.

Finally, in step 560, the residual image distortion map is calculated by applying inverse DCT transform to the DCT coefficients ($B_{i,j}^{x,y}$) in accordance with the equation:

$$w_{x,y} = DCT^{-1}(B_{i,j}^{x,y}) \quad [15]$$

Particularly, from the weighted coefficients $B_{i,j}$, a residual image distortion map of the same size as the target and reference images can be estimated by placing the weighted coefficients $B_{i,j}^x$ and $B\ B_{i,j}^y$ in two DCT images of the same image dimensions as the input reference image f, and performing two fast inverse DCT transforms. Because the DCT can be performed separably, i.e. independently along each axis, and because the number of calculated coefficients is smaller than the number of frequencies, it is not necessary to perform an inverse transform on all rows or columns X×Y of the image. The result of this inverse DCT process is the residual warp, 407. The calculation of the convergence factor, I, is now justified and detailed. Because the estimate of coefficients is an approximation, it is also possible that a residual image distortion map estimate might overshoot the correct position, requiring correction in the next iteration. When this occurs, an oscillation or cycle can develop in the calculated solutions, resulting in slow convergence or possibly even divergence of successive estimates. On the other hand, when the iterative convergence precedes slowly, successive iterations produce a substantially similar estimate of a residual warp. Both these conditions can be detected using a vector composed of the basis coefficients derived at each step in the iteration shown in FIG. 4

In the preferred embodiment we define a direction vector thus:

$$B = (B_{0,0}^x \ldots B_{P-1,Q-1}^x, B_{0,0}^y \ldots B_{P-1,Q-1}^y). \quad [16]$$

However a direction vector could also be formed from the individual motion estimates obtained by estimating shift locally in two subsequent iterations of the algorithm as described by equation [5]. A direction vector is formed during each iteration of the process [400] of FIG. 4 and direction vectors from the current and previous iterations, denoted B and B' respectively are used to determine a convergence factor I that controls the calculation of the residual image distortion map 407 by process 500 of FIG. 5.

If the two direction vectors are substantially aligned, then the sum of the two direction vectors forms a vector longer than their difference, indicating that the iteration is proceeding along a fairly straight path. Alternatively, if the direction vector doubles back from one iteration to the next, the difference of the two direction vectors $v_1$ and $v_2$ forms a vector longer than their sum, indicating that convergence is not smooth and a cycle might be occurring. These conditions may be detected by calculating a convergence ratio R of the difference and the sum of the two normalised direction vectors $v_1$ and $v_2$, and the convergence factor I may be modified accordingly.

$$v_1 = \frac{B}{|B|}, \quad [17]$$

$$v_2 = \frac{B'}{|B'|}$$

$$R = \frac{|v_1 - v_2|}{|v_1 + v_2|} \quad [18]$$

where $B_{i,j}$ is a vector defined in Equations [3] and [4].

If the direction vectors point in substantially the same direction, indicating that convergence is proceeding slowly, then the ratio R will be substantially less than 1, and the step size I can be increased gradually. If the direction vectors point in different directions, indicating that the convergence is unstable or cyclic, then the ratio R is substantially greater than 1, and the step size I can be immediately halved in value. Similarly, if R increases in value by 40% in a single iteration, then instability is indicated, and the step size I is immediately halved in value, i.e. the coefficients in the next iteration will be weighted differently compared to the current iteration.

Figure 6:
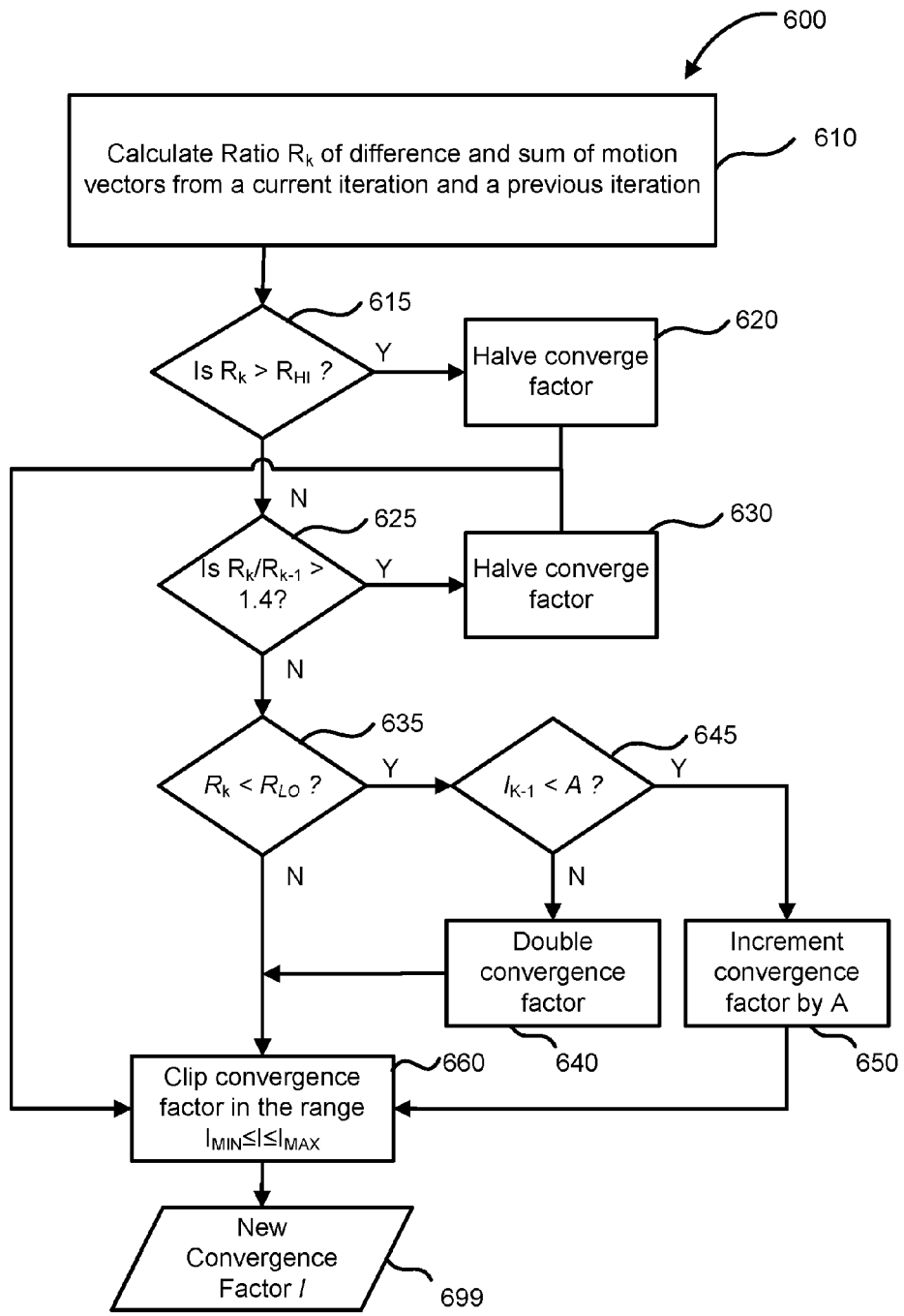
FIG. 6 is a flowchart illustrating an exemplary method for calculating a convergence factor I that can be used in an iterative refinement process.

FIG. 6 describes in detail the calculation of the convergence factor I.

$R_k$ is the value of the ratio R calculated at iteration k, and $I_k$ is the convergence factor I calculated at iteration k. The inputs to the process 600 are a previous set of coefficients B', the current set of coefficients B, the previous convergence factor $I_{k-1}$, and the previous calculated convergence ratio $R_{k-1}$.

Because the process requires a previous set of coefficients, this process is not executed on the first pass of the method 400, but is executed on the second and all subsequent passes. The initial value of the convergence factor I is set to a value near 1.0, with 0.5 providing a reasonable balance between speed of convergence and stability. The initial value of the previous calculated convergence ratio, $R_{k-1}$, is set to 1.

In step 610, the ratio $R_k$ between the difference and the sum of the basis direction vectors $v_1$ and $v_2$ is calculated according to equation [17].

Subsequently, in step 615, $R_k$ is tested for instability caused by a change in direction of the direction vectors using a threshold value $R_{HI}$. If $R_k > R_{HI}$, the convergence factor I is halved in step 620, and control is directed to step 660, else the method proceeds to step 635, where $R_k$ is tested for instability indicated by a sudden increase in its value. If $R_k/R_{k-1} > 1.4$, the convergence factor I is halved in step 630 and control is directed to step 660. Otherwise, the method proceeds to step 635.

At step 635, $R_k$ is tested for slow convergence caused by the direction vectors being similar by comparing $R_k$ with a threshold value $R_{LO}$. If $Rk < R_{LO}$, the method proceeds to step 645, where it is determined whether the convergence $I_{k-1} < A$. If $I_{k-1} < A$, the convergence factor I is doubled in step 640. Otherwise, the convergence factor I is incremented by A in step 650.

The strategy of increasing the convergence factor linearly by addition, and decreasing the convergence factor exponentially by multiplication, provides a steady increase in step size and a fast decrease in step size. Other methods for increasing and decreasing the convergence factor could be used, but this approach has been found to provide the best results.

In step 660 the convergence factor I is finally clipped into the range $I_{MIN} \leq I \leq I_{MAX}$.

The result of the process 600 is a new convergence factor $I_k$.

The values of the parameters in this operation differ according to the application, but appropriate values for the thresholds are $R_{HI} = 0.5$, $R_{LO} = 0.5$, $A = 0.25$, $I_{MAX} = 8$, $I_{MIN} = 1/128$. It will be understood that the use of the convergence factor I is not limited to basis-fitting approaches to estimating a distortion map. Any numerical representation of the distortion map can be used to form a ratio R to estimate the smoothness of convergence. For example, equation [5] describes a method for estimating motion estimates at distinct positions within the images being aligned to be interpolated to form a dense motion estimate. This method can be applied as step 420 in FIG. 4 as an iterative technique for estimating an accurate image distortion map. If this method were used, the direction vectors B and B' as used in equation [17] can be concatenated from individual motion estimates obtained by estimating shift locally in two subsequent iterations of the algorithm as described by equation [5], with B containing a concatenation of motion estimates from the current iteration, and B' containing a concatenation of motion estimates from the previous iteration.

In some implementations, in a process of iteratively aligning the target image to the reference image, during a first iteration a first image distortion map is determined by obtaining a first plurality of motion vectors estimating shifts locally. During a second iteration of aligning the images, a second image distortion map is determined by obtaining a second plurality of motion vectors estimating shifts locally. Preferably shifts for the first and the second image distortion maps are estimated at the same locations of the grid.

Then the first plurality of motion vectors can be concatenated to produce a direction vector B, while the second plurality of motion vectors can be concatenated to produce a direction vector B'. The motion vectors of the distortion maps should be combined co-operatively, i.e. in accordance with a predetermined pattern. The pattern defines how coordinates of the motion vectors are to be combined. Let (x0, y0), (x1, y1), (x2, y2) be motion vectors of an image distortion map measured at first three grid points of the images. In some implementations, the pattern prescribes that the vectors are combined starting from the top left corner of the image distortion map to produce a direction vector (x0, y0, x1, y1, x2, y2). In other implementation, the motion vectors are combined on a coordinate basis to form a direction vector (x0, x1, x2, y0, y1, y2). Regardless of a particular pattern chosen to combine the motion vectors, the same pattern should be maintained to concatenate motion vectors in the first image distortion map and in the second image distortion map respectively.

Additionally, the direction vectors B and B' are normalised as discussed with references to equation [14]. Once the motion vectors are concatenated and normalised, a magnitude of a difference between the first iteration normalised direction vector $v_1$ and the second iteration normalised direction vector $v_2$ is determined. Further, the process determines a magnitude of a sum of the first iteration normalised direction vector $v_1$ and the second iteration normalised direction vector $v_2$. The convergence ratio is calculated in accordance with equation by determining the ratio of the difference and the sum.

The convergence ratio is then analysed, as described above with references to FIG. 6, to determine whether the process of iteratively aligning the target image to the reference image is converging or diverging. Following the analysis described in FIG. 6, if the process is diverging, i.e. the convergence ratio is above a predetermined threshold, the convergence factor I is decreased at 620, thereby to attenuate the motion vectors of the second image distortion map in a manner similar to equation [13]. Otherwise, if the convergence ration does not exceed the predetermined threshold, the convergence factor I can be increased at 640 or 650 to amplify the motion vectors of the second image distortion map.

The adjusted motion vectors form an initial image distortion estimate for a next iteration of the process of aligning the target and reference images.

The arrangements described herein are applicable to registering images, determining an image distortion map between two images, and other image processing applications.

Methods, apparatuses, and computer readable storage mediums for determining an image distortion map have been described. The foregoing describes only some embodiments of the present invention, and modifications and/or changes can be made thereto without departing from the scope and spirit of the invention, the embodiments being illustrative and not restrictive.

I claim:

1. A method for aligning a fixed image and a corresponding moving image, the method comprising:
   selecting a target image and a reference image, the target image being a relatively low resolution representation of the moving image and the reference image being a relatively low resolution representation of the fixed image;
   determining a current image distortion map defining distortions between the selected target image and reference image;
   determining a residual image by comparing the reference image and a warped target image derived from the target image based on the current image distortion map;
   determining a residual image distortion map based on transform coefficients of cosine functions fitted to the residual image, the transform coefficients being determined by applying a discrete cosine transform to a signal formed by the residual image and image gradients of the warped target image or the reference image; and combining the current image distortion map with the residual image distortion map to align the fixed image and the moving image.

2. The method of claim 1, further comprising:
determining a degree of distortion associated with at least one of the fixed image and the moving image using the current image distortion map; and
filtering the transform coefficients based on the degree of distortion.

3. The method of claim 1, wherein the transform coefficients are determined by calculating a discrete cosine transformation of at least one previously determined image gradient.

4. The method of claim 1, further comprising filtering the transform coefficients using a filter.

5. The method of claim 4, wherein the filter has a Gaussian function.

6. The method of claim 5, further comprising determining an improved distortion map by combining the current image distortion map and the residual image distortion map weighted by a current convergence factor, the current convergence factor being determined on a basis of one previous set of transform coefficients.

7. The method of claim 1, wherein the residual image distortion map is produced using inverse discrete cosine transform applied to the transform coefficients.

8. The method of claim 1, wherein determining the residual image distortion map further comprises:
determining a convergence ratio for a current transform coefficient and at least one previous transform coefficient; and
determining a further convergence factor using a previous convergence factor based on said convergence ratio.

9. The method according to claim 1, further comprising:
determining a first iteration characteristic value associated with an iteration of aligning the target image and the reference image based on transform coefficients associated with the iteration;
determining a second iteration characteristic value associated with a subsequent iteration of aligning the target image and the reference image based on transform coefficients associated with the subsequent iteration; and
determining whether a process of aligning the target image and the reference image is converging or diverging based on the first and second iteration characteristic values.

10. The method according to claim 9, wherein the determination of whether a process of aligning the target image and the reference image is converging or diverging further comprises:
calculating a ratio of a difference between the first and second iteration characteristic values and a sum of the first and second iteration characteristic values; and
comparing the ratio with a threshold value to determine whether iterative aligning of the target image to the reference image is converging or diverging.

11. The method according to claim 9, wherein the transform coefficients associated with the subsequent iteration of aligning the target image and the reference image are adjusted in response to the determination of whether iterative aligning of the target image to the reference image is converging or diverging.

12. The method according to claim 9, wherein the transform coefficients associated with the subsequent iteration of aligning the target image and the reference image are amplified linearly if iterative aligning of the target image and the reference image is converging, and
wherein the transform coefficients associated with the subsequent iteration of aligning the target image and the reference image are attenuated exponentially if iterative aligning of the target image and the reference image is diverging.

13. A method for transforming a target image with respect to a reference image, the method comprising:
determining a current image distortion map defining distortions between the target image and the reference image;
determining a residual image by comparing the reference image and a warped target image derived from the target image on a basis of the current image distortion map;
determining a residual image distortion map using a plurality of basis functions having transform coefficients determined by applying a discrete frequency transform to a signal formed based on the residual image and image gradients of the warped target image or the reference image; and
combining the current image distortion map and the residual image distortion map to form an improved distortion map, wherein the improved distortion map is used to transform the target image for displaying on a display device.

14. The method of claim 13, wherein the improved distortion map is determined by combining the current image distortion map and the residual image distortion map weighted by a current convergence factor, the current convergence factor being determined on a basis of at least two previous sets of transform coefficients.

15. The method of claim 13, further comprising:
determining a degree of distortion associated with at least one of the target image and the reference image using the current image distortion map; and
filtering the transform coefficients based on the degree of distortion.

16. A method for determining an image distortion map relating a fixed image and a corresponding moving image, the method comprising:
(a) selecting a target image and a reference image, the target image being a relatively low resolution representation of the moving image and the reference image being a relatively low resolution representation of the fixed image;
(b) determining an initial image distortion map defining distortions between the target image and the corresponding reference image;
(c) using the initial image distortion map to derive an initial warped target image from the target image;
(d) determining current transform coefficients by calculating a discrete frequency transform for a residual image and image gradients in the initial warped target image, wherein the residual image is formed by comparing the reference image and the initial warped target image;
(e) filtering the determined current transform coefficients to form a current residual image distortion map;
(f) determining an improved image distortion map using the initial image distortion map and the current residual image distortion map weighted by a current convergence factor, wherein the current convergence factor is determined on a basis of at least two previous sets of transform coefficients;

(g) applying the determined improved image distortion map to the target image to derive a further warped target image; and (h) repeating steps (d)-(g) for a predetermined number of iterations to determine the image distortion map.

17. The method of claim 16, further comprises:

(i) receiving a further target image and a further reference image having resolution higher than resolution of an initial target and reference images; and (j) repeating steps (d)-(h) for the further target and further reference images using an image distortion map from a previous iteration as an initial image distortion map.

18. The method of claim 17, further comprising determining a further convergence factor using a convergence ratio and the current convergence factor.

19. The method of claim 16, wherein the initial distortion map is constructed from a rigid transformation of the selected target image and reference image.

* * * * *